(12) United States Patent
Eyrignoux et al.

(10) Patent No.: US 11,673,195 B2
(45) Date of Patent: Jun. 13, 2023

(54) METHOD OF ADDITIVE MANUFACTURING OF AN EQUIPMENT PART

(71) Applicant: LISI AEROSPACE ADDITIVE MANUFACTURING, Paris (FR)

(72) Inventors: Bruno Sébastien Eyrignoux, Begles (FR); Fabian Magnin, Begles (FR)

(73) Assignee: LISI AEROSPACE ADDITIVE MANUFACTURING, Paris (FR)

( * ) Notice: Subject to any disclaimer, the term of this patent is extended or adjusted under 35 U.S.C. 154(b) by 197 days.

(21) Appl. No.: 16/831,063

(22) Filed: Mar. 26, 2020

(65) Prior Publication Data
US 2020/0306868 A1    Oct. 1, 2020

(30) Foreign Application Priority Data

Mar. 26, 2019 (FR) .................................. 19 03148

(51) Int. Cl.
| | | |
|---|---|---|
| B22F 7/08 | (2006.01) | |
| B33Y 10/00 | (2015.01) | |
| B33Y 40/00 | (2020.01) | |
| B23H 1/00 | (2006.01) | |
| B23K 15/08 | (2006.01) | |
| B33Y 40/20 | (2020.01) | |
| B22F 12/30 | (2021.01) | |
| B22F 10/66 | (2021.01) | |
| B22F 10/28 | (2021.01) | |
| B22F 12/20 | (2021.01) | |

(52) U.S. Cl.
CPC ................ *B22F 7/08* (2013.01); *B22F 10/66* (2021.01); *B22F 12/30* (2021.01); *B23H 1/00* (2013.01); *B23K 15/08* (2013.01); *B33Y 10/00* (2014.12); *B33Y 40/00* (2014.12); *B33Y 40/20* (2020.01); *B22F 10/28* (2021.01); *B22F 12/20* (2021.01)

(58) Field of Classification Search
CPC .......... B23K 15/08; B23H 1/00; B33Y 10/00; B33Y 40/00; B33Y 40/20; B33Y 80/00; B22F 10/28; B22F 2999/00
USPC .............................................................. 419/29
See application file for complete search history.

(56) References Cited

U.S. PATENT DOCUMENTS

| | | | |
|---|---|---|---|
| 2011/0170977 A1 | 7/2011 | Vagt et al. | |
| 2016/0032766 A1* | 2/2016 | Bunker .................. | F01D 25/14 165/104.34 |
| 2016/0279734 A1 | 9/2016 | Schick et al. | |

FOREIGN PATENT DOCUMENTS

EP            2 602 049 A1    6/2013

OTHER PUBLICATIONS

Rapport De Recherche Preliminarire issued in corresponding French Patent Application No. FR 1903148 dated Nov. 12, 2019, submitted in French.

* cited by examiner

*Primary Examiner* — Brian D Walck
*Assistant Examiner* — Danielle Carda
(74) *Attorney, Agent, or Firm* — Nixon & Vanderhye

(57) ABSTRACT

The invention relates to a method for manufacturing an equipment part, comprising the following steps: providing a substrate, an upper face of which includes a large main surface; providing a computer model comprising spatial coordinates of said main surface and a second portion of the equipment part; then additive manufacturing of the second portion from the main surface, so as to secure said main surface and said second portion; then cutting in a thickness of the substrate to obtain a thin plate including the main surface secured to the second portion of the equipment part.

18 Claims, 7 Drawing Sheets

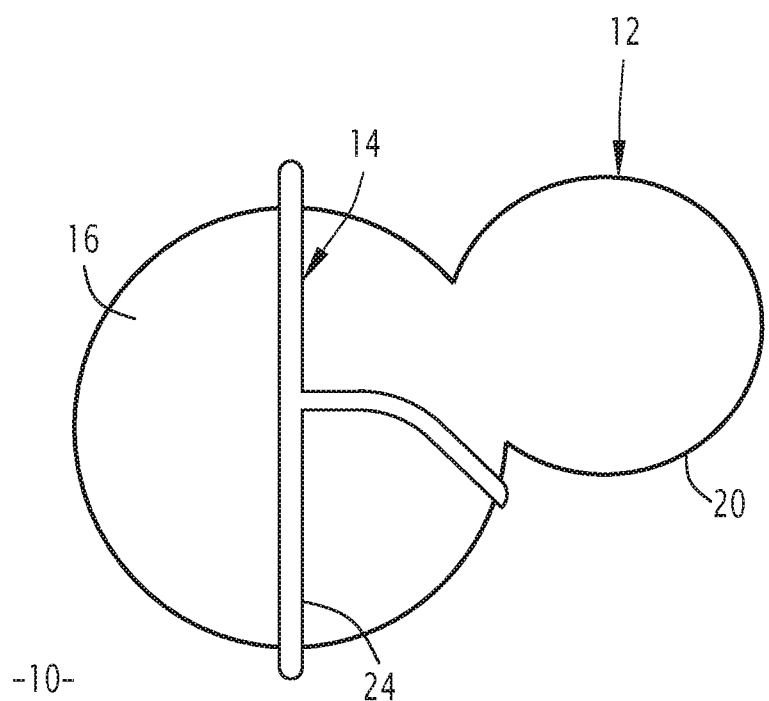
FIG.1
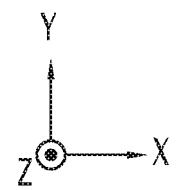

METHOD OF ADDITIVE MANUFACTURING OF AN EQUIPMENT PART

CROSS REFERENCE TO RELATED APPLICATION

This application claims priority of French Patent Application No. 19 03148, filed Mar. 26, 2019. The entire contents of which are hereby incorporated by reference.

BACKGROUND

The present invention relates to a method for manufacturing an equipment part, comprising first and second portions, said first portion comprising a large thin plate, said second portion being secured to said thin plate.

SUMMARY

The invention particularly applies to the manufacture of mechanical parts with complex shapes, for example of the heat exchanger type, in particular in the automotive or aeronautic fields.

Such parts with complex shapes, which are difficult to manufacture by molding or machining, are made in a known manner by additive manufacturing. Several additive manufacturing techniques, also called three-dimensional printing or 3D printing, are known. Techniques based on metal powder melting, added by successive layers, are for example laser sintering (or Direct Metal Laser Sintering—DMLS) or Electron Beam Melting (EBM).

However, such manufacturing methods are difficult to apply to the obtainment of thin metal plates with large dimensions, such as flat surfaces or surfaces having a regular curve. The obtained surfaces generally have rough patches or irregularities, therefore a finish of inferior quality compared to conventional molding or machining techniques.

Furthermore, the additive manufacturing of large thin plates, such as metal sheets, requires special tools to avoid deformations or twisting of said plate, resulting from strong local energy contributions. The parts including such thin sheets or plates must generally undergo heat treatments after manufacturing, to relax the stresses generated in the thin plate during said manufacturing.

It is thus difficult to obtain, by additive manufacturing, parts comprising portions in the form of thin sheet metal, in particular in the order of a millimeter.

The present invention aims to propose a method for manufacturing a part comprising both a thin sheet with large dimensions and a portion with a complex shape, having a quality finish without the aforementioned drawbacks.

To that end, the invention relates to a method of the aforementioned type, comprising the following steps: providing a substrate having a first thickness greater than a second thickness of the thin plate, an upper face of said substrate including a main surface with large dimensions, said upper face being oriented upward; providing a computer model comprising spatial coordinates of said main surface and said second portion of the equipment part; then additive manufacturing of the second portion from the main surface, so as to secure said main surface and said second portion, said manufacturing being done to a series of layers deposited above the main surface; then cutting in the first thickness of the substrate in order to obtain the thin plate having the second thickness, said thin plate including the main surface secured to the second portion of the equipment part.

According to other advantageous aspects of the invention, the method includes one or more of the following features, considered alone or according to all technically possible combinations:

- the main surface of the upper face of the substrate is substantially planar;
- the main surface of the upper face of the substrate has a curve in at least one direction;
- the main surface of the upper face of the substrate comprises one or several holes;
- the substrate comprises at least an opening located on at least an edge of the substrate, at a distance from the main surface;
- the main surface of the upper face of the substrate comprises one or more channels;
- the upper surface of the substrate has a contour delimiting the main surface;
- the upper face comprises a groove forming the contour of the main surface, a depth of said groove being less than the first thickness of the substrate;
- the groove is closed on itself;
- the groove comprises at least an end emerging on an edge of the substrate;
- the cutting operation is done in a thickness of the substrate smaller than the depth of the groove;
- the first and second portions are respectively formed by a first and second metal material, said first and second materials being identical or different;
- the additive manufacturing of the second portion is done by adding successive layers of powder of second metal material on the main surface, each layer being melted before adding the next layer;
- the melting of the powder is done by a laser beam or an electron beam;
- the method further comprises a step in which the unmelted powder is removed from the substrate before the cutting step.

The invention further relates to an equipment part derived from a method as disclosed above.

BRIEF DESCRIPTION OF THE DRAWINGS

The invention will be better understood upon reading the following description, provided solely as a non-limiting example and done in reference to the drawings, in which:

FIG. 1 is a top view of an equipment part according to a first embodiment of the invention;

FIG. 1 and FIG. 2 show an equipment part 10, derived from a method according to one embodiment of the invention. FIG. 6 shows an equipment part 110, derived from a method according to another embodiment of the invention.

DETAILED DESCRIPTION

Figure 2:
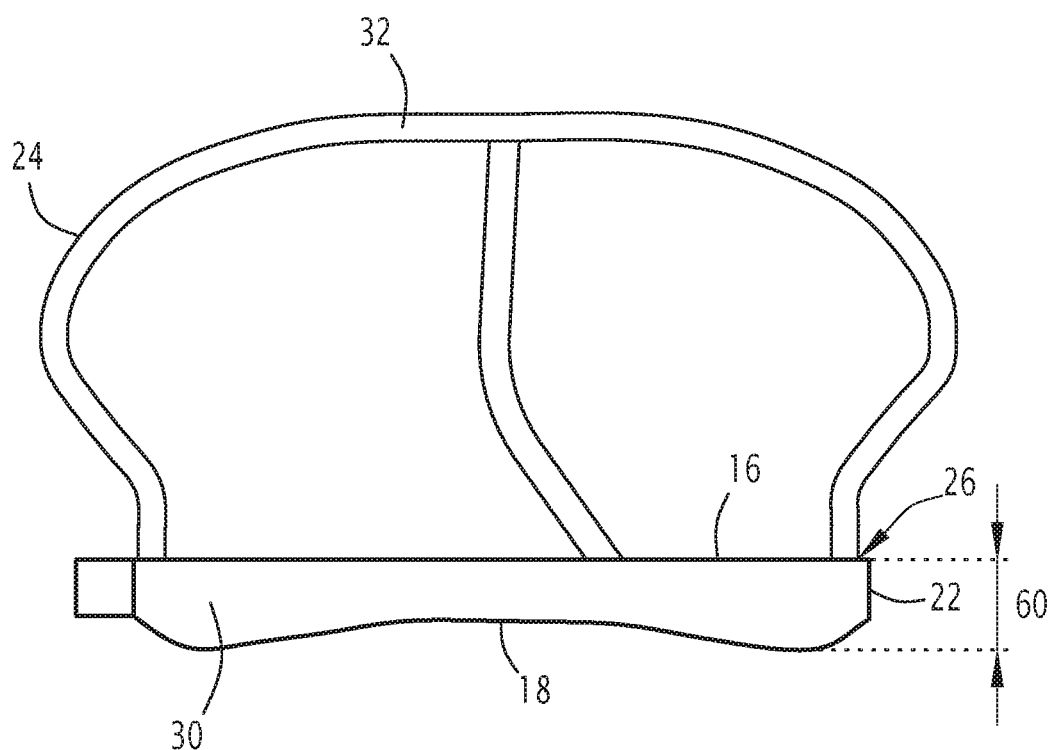
FIG. 2 is a side view of the equipment part of FIG. 1.

In the following description, the equipment parts 10 and 110 will be described simultaneously, the common elements being designated by the same reference numbers.

The equipment part 10, 110 comprises a first 12, 112 and a second 14 portion, which are secured to one another.

The first portion 12, 112 comprises a main surface 16, 116. Preferably, said main surface 16 is substantially planar or has a substantially regular curve in at least one spatial direction.

An orthonormal base (X, Y, Z) is considered. In the illustrated embodiment, the main surface 16, 116 is arranged in a plane (X, Y). More specifically, in the illustrated embodiment, the first portion 12, 112 of the equipment part 10, 110 is substantially in the form of a plate and includes a surface 18, 118 opposite the main surface 16, 116.

In the embodiment illustrated on FIG. 2, the opposite surface 18 has undulations. In the embodiment illustrated on FIG. 6, the opposite surface 118 is planar. In a variant that is not shown, the opposite surface 18 or 118 has a regular curvature.

The first portion 12, 112 is further delimited by a contour 20, 120 in the plane (X, Y). Said contour 20, 120 is embodied by a side wall 22, 122 coupling the main surface 16, 116 and the opposite surface 18, 118.

Preferably, the first portion 12, 112 is in the form of a so-called "thin" plate, that is to say, a maximum thickness 119 (FIG. 6) of said plate, in the direction Z, is less than 10% of a maximum dimension of said first portion 12 in the direction X or Y. According to an embodiment, such as the embodiment of FIG. 6, the main surface 116 of the first portion 112 comprises at least one hole 200, 202, 204, 206. More particularly, in the embodiment of FIG. 6, the main surface 116 comprises a plurality of holes 200, 202, 204, 206.

According to an embodiment, at least one 200, 202 of said holes is crossing, that is, opening on the main surface 116 and on the opposite surface 118. According to another embodiment, at least one of the hole is a blind hole, comprising a bottom 210.

In the illustrated embodiment, each hole 200, 202, 204, 206 extends substantially along Z. In an alternative embodiment, a hole extends in an inclined manner relative to Z.

Figure 6:
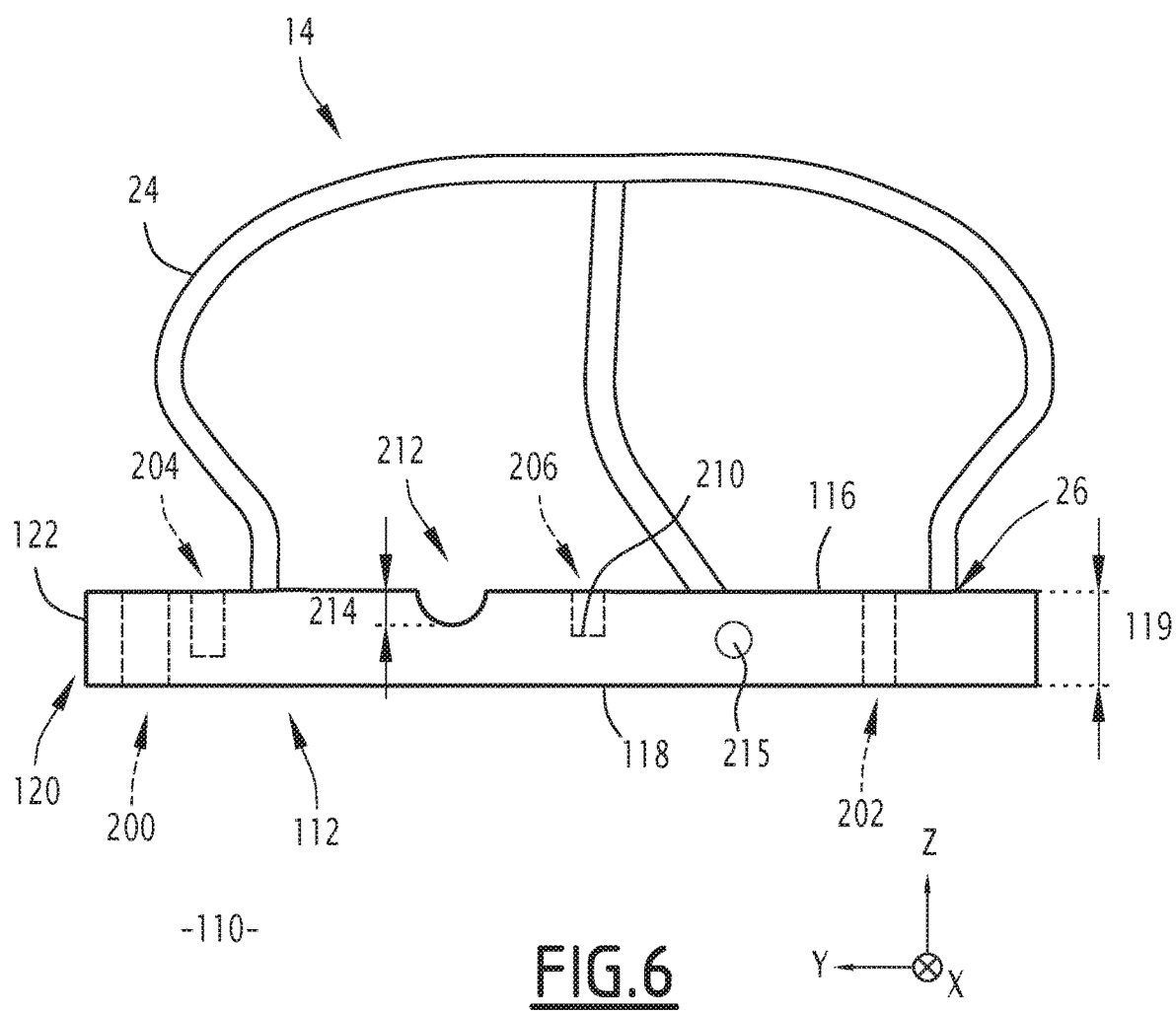
FIG. 6 is a side view of an equipment part according to a second embodiment of the invention.

According to an embodiment, such as the embodiment of FIG. 6, the main surface 116 of the first portion 112 comprises at least one channel 212. In the illustrated embodiment, the channel 212 is substantially rectilinear and comprises two ends opening on the side wall 122. In a variant that is not shown, the channel is non-rectilinear and/or one or the other of its ends is distant from the side wall 122.

In the illustrated embodiment, the channel 212 has a depth 214 substantially constant. In a variant that is not shown, the channel has a variable depth.

According to an embodiment, such as the embodiment of FIG. 6, the side wall 122 comprises at least an opening 215, distant from the main surface 116. Preferably, the opening 215 is also distant from the opposite surface 118.

In the illustrated embodiment, the opening 215 has two ends, each of said ends being open on the side wall 122. Therefore, the opening 215 forms a duct in the thickness of the first portion 112 of the equipment part 110. Such a duct is for example designed for a fluid circulation inside said equipment part.

In a variant that is not shown, the opening 215 has a closed end.

In the illustrated embodiment, the duct 215 is substantially rectilinear and extends along X. Other duct shapes, non-rectilinear or non-planar, may also be considered.

In the illustrated embodiment, the first portion 112 comprises holes 200, 202, 204, 206, at least a channel 212 and at least a duct 215. In variants that are not shown, the first portion only comprises one or some of said features, according to all technically possible combinations.

The second portion 14 of the equipment part 10, 110 is secured to the first portion 12, 112. For simplification, the second portions 14 of the equipment part 10 and 110 are deemed identical.

The second portion 14 of the equipment part 10, 110 is for example formed by elements 24, simple or complex, each of said elements 24 being secured to the main surface 16, 116. An end surface 26 of each of said elements 24 is attached to the main surface 16, 116 of the first portion 12, 112.

The main surface 16, 116 has large dimensions, that is to say, its surface in two spatial directions, for example in the plane (X, Y), is greater than the sum of all of the end surfaces 26 of the elements 24 attached to the main surface 16, 116.

The first 12, 112 and second 14 portions are respectively formed by a first 30 and second 32 metal material. As specified hereinafter, the second material 32 is suitable for an additive manufacturing method of the second portion 14. Furthermore, the first 30 and second 32 materials are chemically compatible, such that said additive manufacturing method of the second portion 14 leads to securing of the end surfaces 26 of the elements 24 with the main surface 16, 116.

According to one preferred embodiment, the first 30 and second 32 materials are made from metal, for example such as steel, aluminum, titanium or nickel alloy, for example known under the Inconel® trademark. Said first 30 and second 32 materials are identical or different.

According to one embodiment variant, the first 30 and second 32 materials are nonmetallic, for example of the polymer type.

Figure 3:
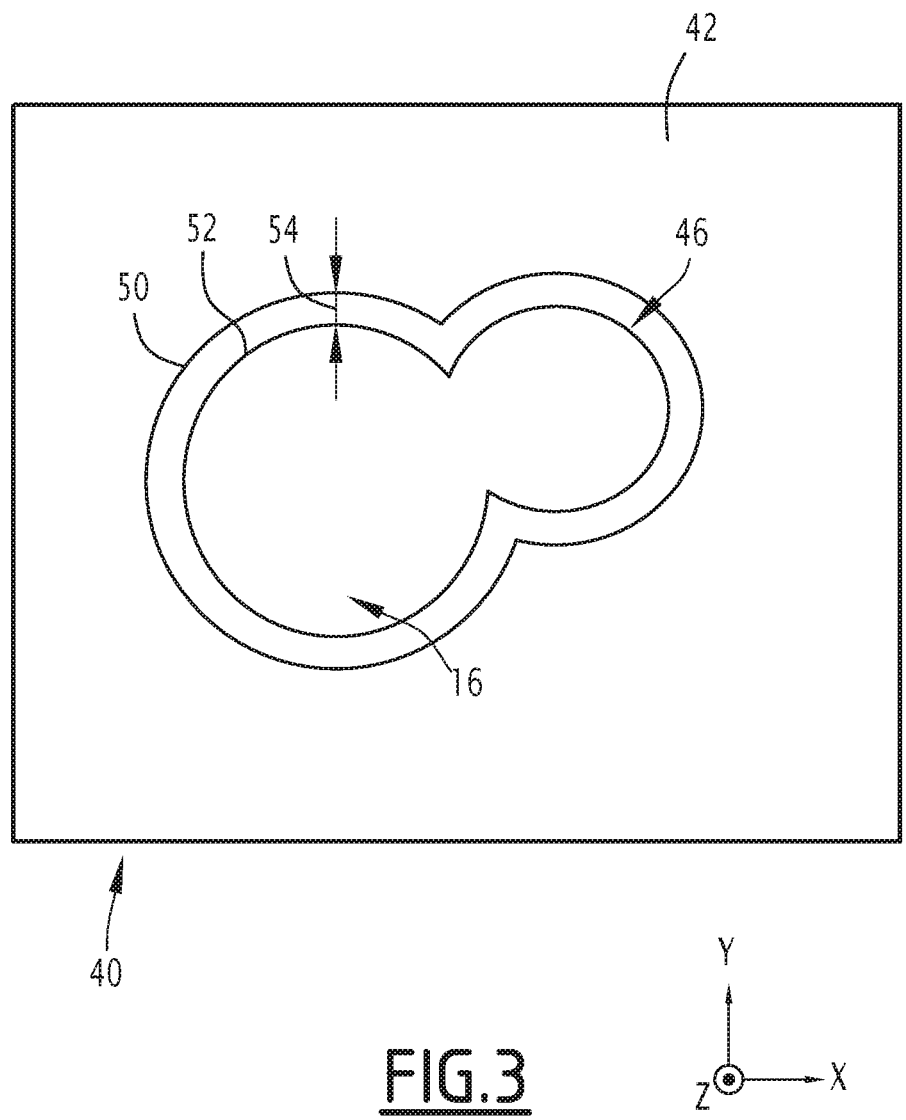
FIG. 3, FIG. 4 and FIG. 5 are illustrations of steps of a method for manufacturing the equipment part of FIG. 1 and FIG. 2.
Figure 4:
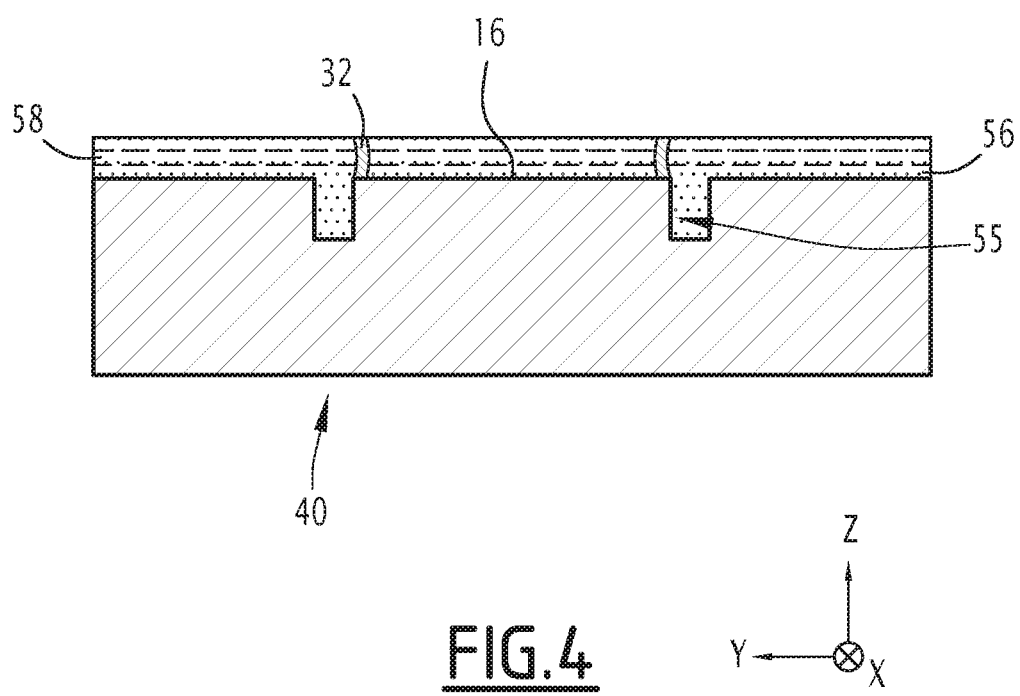
Figure 5:
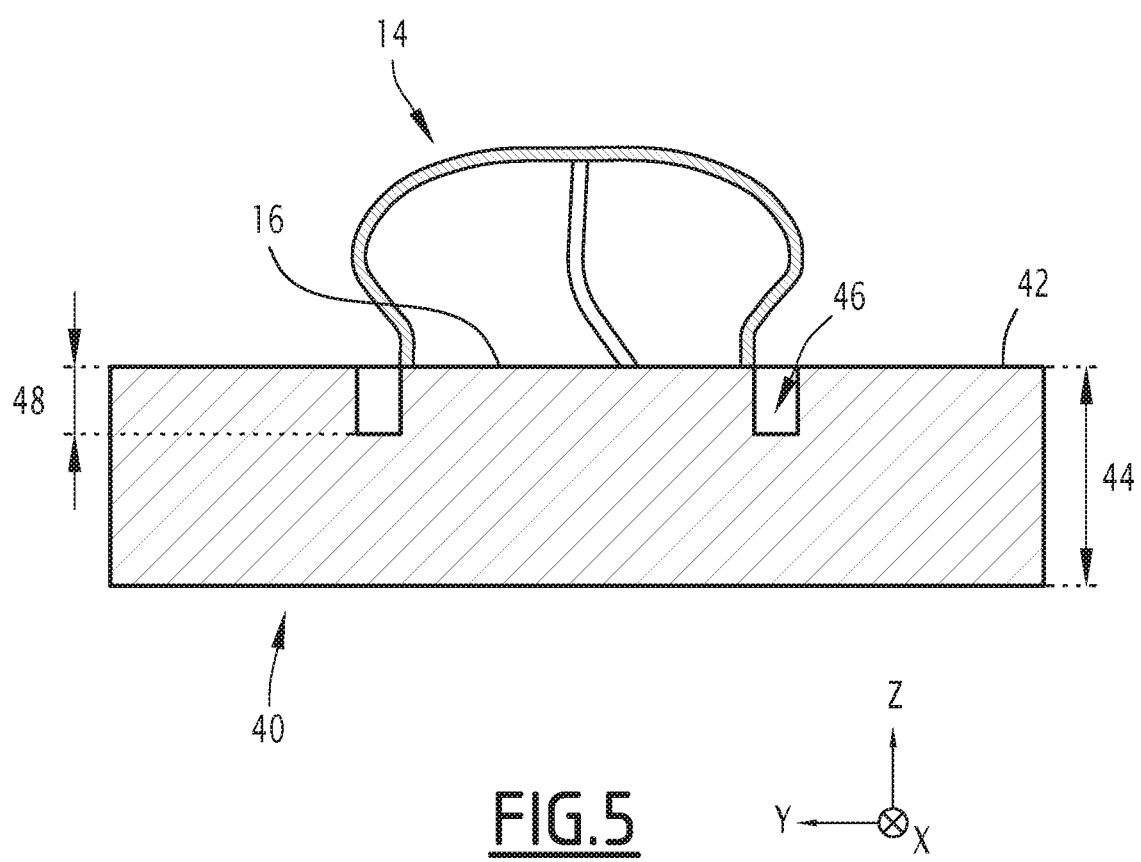
Figure 7:
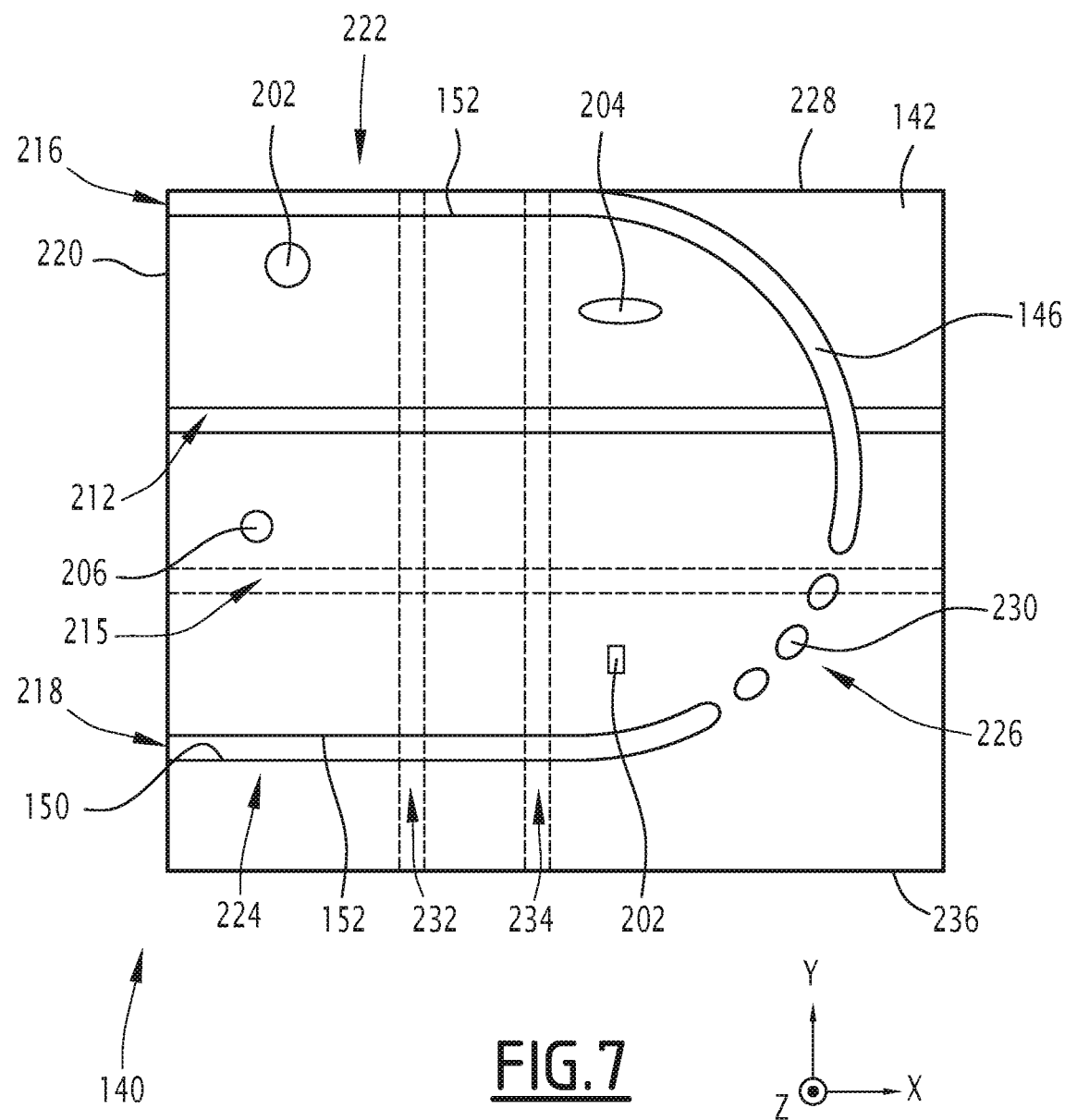
FIG. 7 is an illustration of a step of a method for manufacturing the equipment part of FIG. 6.

FIGS. 3 to 5 show views of steps of a method for manufacturing the equipment part 10. FIG. 7 shows a view of a step of a method for manufacturing the equipment part 110.

In a first step of each of said methods, shown respectively on FIG. 3 and on FIG. 7, a substrate 40, 140, configured for an additive manufacturing method, is provided. The substrate 40, 140 is preferably formed from a piece of the first material 30.

The substrate 40, 140 is for example a plate comprising a substantially planar upper face 42, 142. The substrate 40, 140 has a thickness 44 along Z (FIG. 5) that is sufficient to withstand the deformation or twisting during the additive manufacturing of the elements 24 on the substrate 40, 140.

The substrate 40, 140 for example has a thickness 44 in the order of around ten millimeters, with a minimum of 15 mm, for dimensions along X and Y in the order of around one hundred millimeters.

In the remainder of the description, the direction Z is considered to represent the vertical and the substrate 40, 140 is arranged such that its upper face 42, 142 is oriented upward.

The substrate 40, 140 has a groove 46, 146 formed in the upper face 42. The groove 46, 146 has a depth 48 along Z (FIG. 5).

According to an embodiment, the depth 48 is substantially constant along the whole groove 46, 146. Alternatively, the depth 48 is variable, a maximal value of said depth being smaller than the thickness 44.

The groove 46, 146 has an outer edge 50, 150 and an inner edge 52, 152.

In the embodiment of FIGS. 3 to 5, the groove 46 is closed on itself; in particular, the outer edge 50 is closed on itself. The groove 46 has a width 54 between the outer edge 50 and the inner edge 52.

In the embodiment of FIG. 7, the groove 146 has two ends 216, 218, each of said ends emerging on a first edge 220 of the substrate 140.

The groove 146 of the FIG. 7 comprises several parts 222, 224, 226 designed for illustrating different embodiments of the groove.

For example, a first part 222 of the groove 146, close to the first end 216, is provided along a second edge 228 of the substrate 140. Therefore, the outer edge 150 of the groove 146 does not extend along said first part 222.

On the contrary, a second part 224 of the groove, close to the second end 218, is distant from the edges of the substrate.

Besides, a third part 226 of the groove is discontinuous, formed by a succession of orifices 230.

The upper face 42, 142 of the substrate 40, 140 has sufficient dimensions to include the main surface 16, 116 intended to be part of the first portion 12, 112 of the part 10, 110. Preferably, the groove 46 is closed on itself, as in the embodiment of FIGS. 3 to 5, the inner edge 52 forms the side wall 22 defining the contour 20 of said main surface 16.

In alternative embodiment with an open groove 146, such as the embodiment of FIG. 7, a part of the side wall 122 is preferably formed by the first edge 220 of the substrate.

In a variant that is not shown, the substrate displays an outer contour corresponding to the required contour of the first portion of the equipment part. In such a case, the main surface forms the whole of the upper face of said substrate; and said substrate does not comprise a groove.

Besides, in the embodiment of FIG. 7, the substrate 140 is provided with the holes 200, 202, 204, 206 and the channel 212 already machined on the main surface 116, and the duct 215 already machined in the thickness of said substrate. For example, the holes, the channel and the duct are realized by milling or by a similar technique. Indeed, such operations are easier to carry out before the additive manufacturing step.

Optionally, the substrate 140 is further provided with one or more nozzles 232, 234, opening on edges 228, 236 of said substrate. Preferably, the nozzles 232, 234 are arranged at a distance from the main surface 116, said distance being especially superior to a maximal depth of the groove 146.

The first step of the method for manufacturing the equipment part 10, 110 further comprises providing a computer model comprising spatial coordinates of the second portion 14, as well as the main surface 16, 116 of the first portion 12, 112. In particular, the computer model breaks the second portion 14 down into a multitude of layers arranged along planes (X, Y) and adjacent along Z, from the main surface 16, 116.

In a second step of the manufacturing method, as shown on FIG. 4, a first layer 56 of powder 55 of second material 32 is broken down over all of the upper face 42, 142 of the substrate 40, 140. Moreover, in the case where the substrate 40, 140 comprises a groove 46, 146, said groove is filled with said powder 55.

Preferably, before adding the powder, the substrate 40, 140 is placed in a container (not shown) including edges that retain the powder. Thus, in the case of the groove 146, the powder is prevented from flowing out of the ends 216, 218 and from the first part 222 of said groove.

In a third step of the manufacturing method, a melting of the first layer 56 of powder is done on the main surface 16, 116, as a function of the spatial coordinates of the first layer of the second portion 14, according to the computer model disclosed above.

In the case where the first 30 and second 32 materials are made from metal, the melting of the first layer 56 of powder is for example done according to a laser sintering or electron beam melting technique.

The melting of the first layer 56 allows the formation of the end surfaces 26 of the elements 24, secured to the main surface 16, 116. Preferably, at least some of said end surfaces 26 are arranged along the inner edge 52, 152 of the groove or contour 20, 120.

The second and third steps below are repeated by depositing and melting new successive layers 58 of powder 55, so as to make each of the elements 24. According to known 3D printing techniques, each of the layers 56, 58 for example has a thickness in the order of 50 µm.

Optionally, during the above mentioned steps of additive manufacturing, the equipment part is cooled by circulating a cooling fluid in the nozzles 232, 234. It is also possible to circulate a cooling fluid in the duct 215 during the additive manufacturing.

After completely making the second portion 14 by additive manufacturing, the unmelted powder 55 is removed from the substrate 40, 140 and the second portion 14 attached to said substrate 40, 140 is obtained, as shown in FIG. 5.

Next, a step is performed for cutting in the thickness 44 of the substrate 40, 140, so as to form the opposite surface 18, 118 and to separate the first portion 12 from the rest of the substrate. The cutting in the thickness of the substrate is for example done by spark machining.

Preferably, the depth 48 of the groove is chosen to be greater than a maximum height 60 of the side wall 22, 122 of the part 10, 110 (FIG. 2), so as to simplify the cutting operation. Likewise, the width 54 of the groove 46 is chosen so as to facilitate the cutting step.

Preferably, the cutting operation is done in a thickness of the substrate smaller than the depth 48 of the groove 46, 146. In other words, a maximum thickness of the first portion 12, greater than or equal to the maximum height 60, is less than the depth 48.

In particular, an effect of the cutting step is the separation of the first portion 112 from the nozzles 232, 234, provided in the thickness of the substrate 140 for cooling the part during the additive manufacturing.

In the case where the groove 146 comprises at least a discontinuous part 226, the cutting step also comprises a cutting along the aligned orifices 230, so as to separate the main surface 116 from the rest of the substrate. Said cutting along the orifices 230 is for example done with cutting pliers. Preferably, the cutting along the orifices 230 is done after the cutting in the thickness of the substrate.

A method as disclosed above makes it possible to obtain, by additive manufacturing, a thin plate comprising a main surface 16, 116 with significant dimensions. The method is particularly advantageous for a part 10, 110 comprising a first portion 12, 112 in the form of a thin plate. For information, a maximum height 60 of the side wall 22, 122 is in the order of 1 mm and a depth 48 of the groove 46 is in the order of 2 mm, for a substrate 40 with a thickness 44 of about 30 mm.

Making the groove 46, 146 in the substrate 40 before the additive manufacturing steps makes it possible to define a clean contour of the first portion 12, 112. Additionally, the groove 46 keeps the powder 55 at the edge of the main surface 16, so as to form a plane on which additional layers of powder 56, 58 can be deposited.

A method as disclosed above makes it possible to better control the shape of the main surface 16, 116 than if said surface were made by additive manufacturing, like the second portion 14 of the part 10, 110. Furthermore, such a method avoids later machining operations in order to obtain a thin plate with no deformation or twisting.

The invention claimed is:

1. A method for manufacturing an equipment part comprising first and second portions, said first portion comprising a thin plate,
  the thin plate having a main surface, an opposite surface, and a side wall coupling the main surface and the opposite surface,
  the second portion being formed by elements, an end surface of each of said elerrrents being attached to the main surface,
  the main surface having large dimensions, that is to say, greater than a sum of all of the end surfaces of the elements of the second portion,
  said method comprising:
    providing a substrate having a first thickness greater than a second thickness of the thin plate, an upper face of said substrate being oriented upward; said upper face comprising a groove having an outer edge and an inner edge, said groove having a depth smaller than the first thickness; the inner edge of the groove forming a contour of an initial surface, included in the upper face of the substrate;
    providing a computer model comprising spatial coordinates of the main surface and the second portion of the equipment part;
    additive manufacturing of the second portion from the initial surface of the substrate, so as to secure said initial surface and said second portion, said manufacturing being done to a series of layers deposited above the main surface; and
    cutting in the first thickness of the substrate in order to form the opposite surface and to obtain the thin plate having the second thickness, the main surface of the thin plate being formed by the initial surface of the substrate, the side wall of the thin plate being formed by the inner edge of the groove, the main surface of the thin plate being secured to the second portion of the equipment part.

2. The manufacturing method according to claim 1, wherein the initial surface of the upper face of the substrate is substantially planar.

3. The manufacturing method according to claim 1, wherein the initial surface of the upper face of the substrate has a curve in at least one direction.

4. The manufacturing method according to claim 1, wherein the initial surface of the upper face of the substrate comprises one or several holes.

5. The manufacturing method according to claim 1, wherein the substrate comprises at least an opening located on at least an edge of the substrate, at a distance from the initial surface.

6. The manufacturing method according to claim 1, wherein the initial surface of the upper face of the substrate comprises one or more channels.

7. The manufacturing method according to claim 1, wherein the groove is closed on itself.

8. A method for manufacturing an equipment part comprising first and second portions, said first portion comprising a thin plate,
  the thin plate having a main surface, an opposite surface, and a side wall coupling the main surface and the opposite surface,
  the second portion being formed by additive. manufacturing,
  said method comprising:
    providing a substrate having a first thickness greater than a second thickness of the thin plate, an upper face of said substrate being oriented upward; said upper face comprising a groove having an outer edge and an inner edge, said groove having a depth smaller than the first thickness; the inner edge of the groove forming a contour of an initial surface, included in the upper face of the substrate;
    providing a computer model comprising spatial coordinates of the main surface and the second portion of the equipment part.;
    additive manufacturing of the second portion from the initial surface of the substrate, so as to secure said initial surface and said second portion, said manufacturing being done to a series of layers deposited above the main surface; and
    cutting in the first thickness of the substrate in order to form the opposite surface and to obtain the thin plate having the second thickness, the main surface of the thin plate being formed by the initial surface of the substrate, the side wall of the thin plate being formed by the inner edge of the groove, the main surface of the thin plate being secured to the second portion of the equipment part.

9. The manufacturing method according to claim 8, wherein the first and second portions are respectively formed by a first and second metal material, said first and second materials being identical or different.

10. The manufacturing method according to claim 9, wherein the additive manufacturing of the second portion comprises adding successive layers of powder of second metal material on the main surface, each layer being melted before adding the next layer.

11. The manufacturing method according to claim 10, wherein the melting of the powder is done by a laser beam or an electron beam.

12. The manufacturing method according to claim 10, further comprising removing the unmelted powder from the substrate prior to the cutting in the first thickness of the substrate.

13. The manufacturing method according to claim 8, wherein the initial surface of the upper face of the substrate is substantially planar.

14. The manufacturing method according to claim 8, wherein the initial surface of the upper face of the substrate has a curve in at least one direction.

15. The manufacturing method according to claim 8, wherein the initial surface of the upper face of the substrate comprises one or several holes.

16. The manufacturing method according to claim 8, wherein the substrate comprises at least an opening located on at least an edge of the substrate, at a distance from the initial surface.

17. The manufacturing method according to claim 8, wherein the initial surface of the upper face of the substrate comprises one or more channels.

18. The manufacturing method according to claim 8, wherein the groove is closed on itself.

* * * * *